United States Patent
Yamamoto et al.

(10) Patent No.: US 10,230,103 B2
(45) Date of Patent: Mar. 12, 2019

(54) NEGATIVE ELECTRODE ACTIVE MATERIAL, NEGATIVE ELECTRODE AND BATTERY

(71) Applicant: NIPPON STEEL & SUMITOMO METAL CORPORATION, Tokyo (JP)

(72) Inventors: Sukeyoshi Yamamoto, Nishinomiya (JP); Noriyuki Negi, Kisarazu (JP); Tatsuo Nagata, Ikeda (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/115,930

(22) PCT Filed: Feb. 25, 2015

(86) PCT No.: PCT/JP2015/000958
§ 371 (c)(1),
(2) Date: Aug. 2, 2016

(87) PCT Pub. No.: WO2015/129267
PCT Pub. Date: Sep. 3, 2015

(65) Prior Publication Data
US 2017/0170471 A1    Jun. 15, 2017

(30) Foreign Application Priority Data
Feb. 25, 2014 (JP) .................. 2014-034272

(51) Int. Cl.
*H01M 4/38* (2006.01)
*H01M 4/134* (2010.01)
(Continued)

(52) U.S. Cl.
CPC ............... *H01M 4/38* (2013.01); *C22C 9/02* (2013.01); *H01M 4/043* (2013.01);
(Continued)

(58) Field of Classification Search
None
See application file for complete search history.

(56) References Cited

U.S. PATENT DOCUMENTS

2003/0118908 A1* 6/2003 Ishikawa ............... H01M 4/364
429/231.8
2008/0233479 A1   9/2008 Sung et al.
(Continued)

FOREIGN PATENT DOCUMENTS

EP    1 313 158       5/2003
JP    2008-016446    1/2008
(Continued)

OTHER PUBLICATIONS

Tamura et al. Journal of Power Sources 107 (2002) 48-55.*
Hu et al., "Sn buffered by . . . lithium ion batteries", Acta Materialia 60 (2012), pp. 4695-4703 (Jun. 29, 2012).

*Primary Examiner* — Wojciech Haske
(74) *Attorney, Agent, or Firm* — Clark & Brody (57) ABSTRACT

Provided is a negative electrode active material that can improve the discharge capacity per volume and charge-discharge cycle characteristics. The negative electrode active material of the present embodiment includes a powder material and an oxide layer. The powder material contains an alloy phase which undergoes thermoelastic diffusionless transformation when releasing metal ions or occluding the metal ions. The oxide layer is formed on the surface of the powder material, and has a thickness of not more than 10 nm.

11 Claims, 4 Drawing Sheets

(51) Int. Cl.
*C22C 9/02* (2006.01)
*H01M 4/36* (2006.01)
*H01M 4/04* (2006.01)
*H01M 4/62* (2006.01)
*H01M 10/0525* (2010.01)
*H01M 4/02* (2006.01)

(52) U.S. Cl.
CPC ....... *H01M 4/0404* (2013.01); *H01M 4/0471* (2013.01); *H01M 4/134* (2013.01); *H01M 4/364* (2013.01); *H01M 4/387* (2013.01); *H01M 4/622* (2013.01); *H01M 4/625* (2013.01); *H01M 10/0525* (2013.01); *H01M 2004/027* (2013.01)

(56) References Cited

U.S. PATENT DOCUMENTS

2009/0162750 A1* 6/2009 Kawakami ............. H01G 11/46
429/218.1
2010/0323098 A1* 12/2010 Kosuzu ................ H01M 4/134
427/77

FOREIGN PATENT DOCUMENTS

| | | |
|---|---|---|
| JP | 4056180 | 3/2008 |
| JP | 2010-044957 | 2/2010 |
| JP | 2010-135336 | 6/2010 |
| JP | 2010-161078 | 7/2010 |

* cited by examiner

NEGATIVE ELECTRODE ACTIVE MATERIAL, NEGATIVE ELECTRODE AND BATTERY

TECHNICAL FIELD

The present invention relates to an electrode active material, and more particularly to a negative electrode active material.

BACKGROUND ART

Recently, small electronic appliances such as home video cameras, note PCs, and smart phones have become widespread, and attaining higher capacity and longer service life of batteries has become a technical problem.

Given that hybrid vehicles, plug-in hybrid vehicles, and electric vehicles will be further spread, size reduction of batteries is also a technical problem.

At present, graphite-based negative electrode active materials are utilized for lithium ion batteries. However, graphite-based negative electrode active materials have technical problem as described above.

Accordingly, alloy-based negative electrode active materials have gained attention, which have higher capacity than those of the graphite-based negative electrode active materials. As an alloy-based negative electrode active material, silicon (Si)-based negative electrode active materials and tin (Sn)-based negative electrode active materials are known. To realize a lithium ion battery having a smaller size and a longer life, various studies have been conducted on the above described alloy-based negative electrode active materials.

However, an alloy-based negative electrode active material repeatedly undergoes large expansion and contraction in volume at the time of charging/discharging. For that reason, the capacity of the alloy-based negative electrode active material is prone to deteriorate. For example, a volume expansion/contraction ratio of graphite associated with charging is about 12%. In contrast, the volume expansion/contraction ratio of Si single substance or Sn single substance associated with charging is about 400%. For this reason, if a negative electrode plate of Si single substance or Sn single substance is repeatedly subjected to charging and discharging, significant expansion and contraction occur, thereby causing cracking in negative electrode compound which is applied on the current collector of the negative electrode plate. Consequently, the capacity of the negative electrode plate rapidly decreases. This is chiefly caused by the fact that some of the active substances are freed due to volume expansion/contraction and thereby the negative electrode plate loses electron conductivity.

US2008/0233479A (Patent Literature 1) proposes a method for solving the above described problem of an alloy-based negative electrode active material. To be more specific, the negative electrode material on Patent Literature 1 includes a Ti—Ni superelastic alloy, and Si particles formed in the superelastic alloy. Patent Literature 1 describes that a large expansion/contraction change of Si particle, which occurs following occlusion and release of lithium ions, can be suppressed by the superelastic alloy.

CITATION LIST

Patent Literature

Patent Literature 1: US2008/0233479A

However, the charge-discharge cycle characteristics of the secondary battery in Patent Literature 1 may not be sufficiently improved by the technique disclosed therein. Most of all, it may be highly difficult to actually produce the negative electrode active material proposed by Patent Literature 1.

SUMMARY OF INVENTION

It is an objective of the present invention to provide a negative electrode active material which can improve the discharge capacity per volume and/or charge-discharge cycle characteristics thereof.

The negative electrode active material of the present embodiment includes a powder material and an oxide layer. The powder material contains an alloy phase which undergoes thermoelastic diffusionless transformation when releasing metal ions or occluding metal ions. The oxide layer is formed on the surface of the powder material, and has a thickness of not more than 10 nm.

The negative electrode active material of the present embodiment can improve the discharge capacity per volume and the charge-discharge cycle characteristics.

DESCRIPTION OF EMBODIMENTS

Hereinafter, with reference to the drawings, embodiments of the present invention will be described in detail. Like parts or corresponding parts in the drawings are given a like reference symbol and description thereof will not be repeated.

The negative electrode active material according to the present embodiment includes a powder material and an oxide layer. The powder material contains an alloy phase. The alloy phase undergoes thermoelastic diffusionless transformation when releasing or occluding metal ions. The powder material includes an oxide layer on the surface thereof. The thickness of the oxide layer is not more than 10 nm.

A "negative electrode active material" referred herein is preferably a negative electrode active material for nonaqueous electrolyte secondary batteries. A "thermoelastic diffusionless transformation" referred herein is so-called thermoelastic martensitic transformation. A "metal ion" refers to, for example, a lithium ion, magnesium ion, sodium ion, and the like. A preferable metal ion is lithium ion.

This negative electrode active material may contain other phases different from the above described alloy phases. The other phases include, for example, a silicon (Si) phase, a tin (Sn) phase, other alloy phases (alloy phases which do not undergo thermoelastic diffusionless transformation) excepting the above described alloy phases, and the like.

Preferably, the above described alloy phases are main components (main phases) of the negative electrode active material. "Main component" refers to a component which occupies not less than 50% by volume. The alloy phase may contain impurities to the extent that the spirit of the present invention is unimpaired. However, the impurities are contained preferably as little as possible.

A negative electrode formed of a negative electrode active material of the present embodiment has a higher volumetric discharge capacity (discharge capacity per volume) than that of a negative electrode made of graphite, when used in a nonaqueous electrolyte secondary battery. Further, a nonaqueous electrolyte secondary battery using a negative electrode containing a negative electrode active material of the present embodiment has a higher capacity retention ratio than one using a conventional alloy-based negative electrode. Therefore, the negative electrode active material can sufficiently improve the charge-discharge cycle characteristics of the nonaqueous electrolyte secondary battery.

A possible reason why the capacity retention ratio is high is that strain, due to expansion/contraction that occurs at the time of charging/discharging, is relaxed by thermoelastic diffusionless transformation. Moreover, the fact that the powder material includes an oxide layer on the surface thereof, and the thickness of the oxide layer is not more than 10 nm may also contribute to a high capacity retention ratio. Details thereof will be described later.

The alloy phase may be of any one of the following types 1 to 4.

The alloy phase of type 1 undergoes thermoelastic diffusionless transformation when occluding metal ions, and undergoes reverse transformation when releasing metal ions. In this case, the alloy phase is a matrix phase in a normal state.

The alloy phase of type 2 undergoes reverse transformation when occluding metal ions, and undergoes thermoelastic diffusionless transformation when releasing metal ions. In this case, the alloy phase is a martensite phase in a normal state.

The alloy phase of type 3 undergoes supplemental deformation (slip deformation or twin deformation) when occluding metal ions, and returns to the original martensite phase when releasing metal ions. In this case, the alloy phase is a martensite phase in a normal state.

The alloy phase of type 4 transforms from a martensite phase to another martensite phase when occluding metal ions, and returns to the original martensite phase when releasing metal ions. In this case, the alloy phase is a martensite phase in a normal state.

In the case of the alloy phase of type 1, preferably, the crystal structure of the alloy phase after thermoelastic diffusionless transformation is either of 2H, 3R, 6R, 9R, 18R, M2H, M3R, M6R, M9R, and M18R in Ramsdell notation, and the crystal structure of the alloy phase after reverse transformation is $DO_3$ in Strukturbericht notation. More preferably, the crystal structure of the alloy phase after thermoelastic diffusionless transformation is the above described 2H, and the crystal structure of the alloy phase after reverse transformation is the above described $DO_3$.

In the case of the alloy phase of type 1, preferably, the alloy phase contains Cu and Sn, and also contains the above described 2H structure after thermoelastic diffusionless transformation, and the above described $DO_3$ structure after reverse transformation.

The above described alloy phase may contain one or more selected from the group consisting of Ti, V, Cr, Mn, Fe, Co, Ni, Zn, Al, Si, B, and C, and Sn, with balance being Cu and impurities.

The above described alloy phase may also contain one or more selected from the group consisting of δ phase of F-Cell structure, ε phase of 2H structure, η' phase of monoclinic crystal, and a phase having $DO_3$ structure, each including site deficiency.

All of these δ phase, ε phase, η' phase, and phase having $DO_3$ structure, each including site deficiency form a storage site and a diffusion site of metal ions (Li ions, etc.) in the negative electrode active material. Thereby, the volumetric discharge capacity and the cycle characteristics of the negative electrode active material are further improved.

In the above described negative electrode active material, a volume expansion ratio or volume contraction ratio of a unit cell of the above described alloy phase before and after the phase transformation is preferably not more than 20%, and more preferably not more than 10%. The volume expansion ratio of unit cell is defined by the following Formula (1), and the volume contraction ratio of unit cell is defined by the following Formula (2).

(Volume expansion ratio of unit cell)=[(volume of unit cell when metal ions are occluded)−(volume of unit cell when metal ions are released)]/(volume of unit cell when metal ions are released)×100    (1)

(Volume contraction ratio of unit cell)=[(volume of unit cell when metal ions are occluded)−(volume of unit cell when metal ions are released)]/(volume of unit cell when metal ions are occluded)×100    (2)

The volume of unit cell at the time of releasing, which corresponds to a crystal lattice range of unit cell at the time of occluding, is substituted into "volume of unit cell when metal ions are released" in Formulas (1) and (2).

The above described negative electrode active material can be used as active material for making up an electrode, particularly electrode of a nonaqueous electrolyte secondary battery. An example of the nonaqueous electrolyte secondary battery is a lithium ion secondary battery.

Hereinafter, negative electrode active materials according to the present embodiment will be described in detail.

<Negative Electrode Active Material>

A negative electrode active material relating to embodiments of the present invention contains a powder material and an oxide layer. The powder material contains an alloy phase. The alloy phase undergoes thermoelastic diffusionless transformation when releasing or occluding metal ions. The powder material has an oxide layer on the surface thereof. The thickness of the oxide layer is not more than 10 nm. The power material contains a plurality of powder particles. The powder material is substantially composed of a plurality of powder particles, and more particularly the powder material is composed of a plurality of powder particles and impurities. Therefore, the oxide layer is formed on the surface of the powder particle.

The oxygen concentration in the oxide layer of the surface is generally highest at the surface, and exhibits a concentration gradient decreasing in the depth direction, eventually reaching a constant value at a certain depth. In the present embodiment, the oxide layer of the surface refers to a layer having a thickness corresponding to a half of the depth at which the oxygen concentration becomes constant, when the alloy powder is subjected to quantitative analysis of oxygen from the surface in the depth direction.

[Alloy Phase]

The alloy phase undergoes thermoelastic diffusionless transformation when releasing metal ions represented by Li ions, or occluding the metal ions, as described above. The thermoelastic diffusionless transformation is also called as thermoelastic martensitic transformation. Hereinafter, in the present description, the thermoelastic martensitic transformation is simply referred to as "M transformation" and the martensite phase as "M phase". An alloy phase that undergoes M transformation when occluding or releasing metal ions is also referred to as a "specific alloy phase".

The specific alloy phase is dominantly made up of at least one of M phase and a matrix phase. The specific alloy phase repeats occlusion/release of metal ions at the time of charging/discharging. Then, the specific alloy phase undergoes M transformation, reverse transformation, supplemental deformation, etc. in response to occlusion and release of metal ions. These transformation behaviors mitigate strain which is caused by expansion and contraction of the alloy phase when occluding and releasing metal ions.

The specific alloy phase may be any one of the above described types 1 to 4. Preferably, the specific alloy phase is of type 1. That is, the specific alloy phase preferably undergoes M transformation when occluding metal ions, and undergoes reverse transformation when releasing metal ions.

The crystal structure of the specific alloy phase is not specifically limited. If the alloy phase is of type 1, and the crystal structure of the specific alloy phase (that is, a matrix phase) after reverse transformation is $\beta_1$ phase ($DO_3$ structure), the crystal structure of the specific alloy phase (that is, M phase) after M transformation is, for example, $\beta_1'$ phase ($M18R_1$ structure of monoclinic crystal or $18R_1$ structure of orthorhombic crystal), $\gamma_1'$ phase (M2H structure of monoclinic crystal or 2H structure of orthorhombic crystal), $\beta_1''$ phase ($M18R_2$ structure of monoclinic crystal or $18R_2$ structure of orthorhombic crystal), $\alpha_1'$ phase (M6R structure of monoclinic crystal or 6R structure of orthorhombic crystal), and the like.

If the crystal structure of the matrix phase of the specific alloy phase is 02 phase (B2 structure), the crystal structure of M phase of the specific alloy phase is, for example, $\beta_2'$ phase (M9R structure of monoclinic crystal or 9R structure of orthorhombic crystal), $\gamma_2'$ phase (M2H structure of monoclinic crystal or 2H structure of orthorhombic crystal), and $\alpha_2'$ phase (M3R structure of monoclinic crystal or 3R structure of orthorhombic crystal).

If the matrix phase of the alloy phase has a face-centered cubic lattice, the crystal structure of M phase of the alloy phase has, for example, a face-centered tetragonal lattice, and a body-centered tetragonal lattice.

Such symbols as the above described 2H, 3R, 6R, 9R, 18R, M2H, M3R, M6R, M9R, and M18R are used as the method of denoting crystal structures of a layered construction according to Ramsdell's classification. The symbols H and R mean that respective symmetries in the direction perpendicular to the lamination plane are hexagonal symmetry and rhombohedral symmetry. If there is no M appended at the beginning, it means that the crystal structure is an orthorhombic crystal. If there is M appended at the beginning, it means that the crystal structure is a monoclinic crystal. Even if same classification symbols are used, there are cases in which distinction is made by the difference in the order of the layers. For example, since $\beta_1'$ phase and $\beta_1''$ phase, which are two kinds of M phase, have a different layered construction, there are cases in which they are distinguished by being denoted as $18R_1$ and $18R_2$, or $M18R_1$ and $M18R_2$ etc., respectively.

In General, M transformation and reverse transformation in normal shape memory effects and pseudoelastic effects often involve volume contraction or volume expansion. When a negative electrode active material relating to the present embodiment electrochemically releases or occludes metal ions (for example, lithium ions), it is considered that the crystal structure often changes in consistent with the phenomena of volume contraction or volume expansion in the direction of respective transformation.

However, the negative electrode active material according to the present embodiment will not be particularly limited by such restriction. When M transformation or reverse transformation occurs following occlusion and release of metal ions in the specific alloy phase, there may be generated other crystal structures than the crystal structure that appears at the time of ordinary shape memory effects and pseudoelastic effects.

When the specific alloy phase is of type 3, the specific alloy phase undergoes slip deformation or twin deformation following occlusion or release of metal ions. In slip deformation, since dislocation is introduced as the lattice defect, reversible deformation is difficult. Therefore, when the specific alloy phase is of type 3, it is preferable that twin deformation dominantly occurs.

[Chemical Composition of Specific Alloy Phase]

The chemical composition of a negative electrode active material containing the above described specific alloy phase will not be particularly limited provided that the crystal structure at the time of M transformation and reverse transformation contains the above described crystal structures.

When the specific alloy phase is of type 1, the chemical composition of the negative electrode active material containing the specific alloy phase contains, for example, Cu (copper) and Sn (tin).

When the specific alloy phase is of type 1, preferably, the crystal structure of the specific alloy phase after reverse transformation caused by discharge of metal ions is $DO_3$ structure, and the crystal structure of the specific alloy phase after M transformation caused by occlusion of metal ions is 2H structure.

Preferably, the chemical composition of a specific alloy phase contains Sn, with the balance being Cu and impurities. More preferably, the specific alloy phase contains 10 to 20 at % or 21 to 27 at % of Sn, with the balance being Cu and impurities, wherein the specific alloy phase contains 2H structure after M transformation, and $DO_3$ structure after reverse transformation. A more preferable Sn content in the specific alloy phase is 13 to 16 at %, 18.5 to 20 at %, or 21 to 27 at %.

The chemical composition of a specific alloy phase may contain one or more selected from the group consisting of Ti, V, Cr, Mn, Fe, Co, Ni, Zn, Al, Si, B, and C, and Sn, with the balance being Cu and impurities.

Preferably, the chemical composition of the specific alloy phase in this case contains: Sn: 10 to 35 at %, and one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less, with the balance being Cu and impurities. The above described Ti, V, Cr, Mn, Fe, Co, Ni, Zn, Al, Si, B and C are optional elements.

A preferable upper limit of Ti content is 9.0 at % as described above. The upper limit of Ti content is more preferably 6.0 at %, and further preferably 5.0 at %. A lower limit of Ti content is preferably 0.1 at %, more preferably 0.5 at %, and further preferably 1.0 at %.

A preferable upper limit of V content is 49.0 at % as described above. The upper limit of V content is more preferably 30.0 at %, further preferably 15.0 at %, and furthermore preferably 10.0 at %. A lower limit of V content is preferably 0.1 at %, more preferably 0.5 at %, and further preferably 1.0 at %.

A preferable upper limit of Cr content is 49.0 at % as described above. The upper limit of Cr content is more preferably 30.0 at %, further preferably 15.0 at %, and furthermore preferably 10.0 at %. A lower limit of Cr content is preferably 0.1 at %, more preferably 0.5 at %, and further preferably 1.0 at %.

A preferable upper limit of Mn content is 9.0 at % as described above. The upper limit of Mn content is more preferably 6.0 at %, and further preferably 5.0 at %. A lower limit of Mn content is preferably 0.1 at %, more preferably 0.5 at %, and further preferably 1.0 at %.

A preferable upper limit of Fe content is 49.0 at % as described above. The upper limit of Fe content is more preferably 30.0 at %, further preferably 15.0 at %, and furthermore preferably 10.0 at %. A lower limit of Fe content is preferably 0.1 at %, more preferably 0.5 at %, and further preferably 1.0 at %.

A preferable upper limit of Co content is 49.0 at % as described above. The upper limit of Co content is more preferably 30.0 at %, further preferably 15.0 at %, and furthermore preferably 10.0 at %. A lower limit of Co content is preferably 0.1 at %, more preferably 0.5 at %, and further preferably 1.0 at %.

A preferable upper limit of Ni content is 9.0 at % as described above. The upper limit of Ni content is more preferably 5.0 at %, and further preferably 2.0 at %. A lower limit of Ni content is preferably 0.1 at %, more preferably 0.5 at %, and further preferably 1.0 at %.

A preferable upper limit of Zn content is 29.0 at % as described above. The upper limit of Zn content is more preferably 27.0 at %, and further preferably 25.0 at %. A lower limit of Zn content is preferably 0.1 at %, more preferably 0.5 at %, and further preferably 1.0 at %.

A preferable upper limit of Al content is 49.0 at % as described above. The upper limit of Al content is more preferably 30.0 at %, further preferably 15.0 at %, and furthermore preferably 10.0 at %. A lower limit of Al content is preferably 0.1 at %, more preferably 0.5 at %, and further preferably 1.0 at %.

A preferable upper limit of Si content is 49.0 at % as described above. The upper limit of Si content is more preferably 30.0 at %, further preferably 15.0 at %, and furthermore preferably 10.0 at %. A lower limit of Si content is preferably 0.1 at %, more preferably 0.5 at %, and further preferably 1.0 at %.

A preferable upper limit of B content is 5.0 at %. The lower limit of B content is preferably 0.01 at %, more preferably 0.1 at %, further preferably 0.5 at %, and furthermore preferably 1.0 at %.

A preferable upper limit of C content is 5.0 at %. The lower limit of C content is preferably 0.01 at %, more preferably 0.1 at %, further preferably 0.5 at %, and furthermore preferably 1.0 at %.

Preferably, the specific alloy phase contains one or more selected from the group consisting of δ phase of F-Cell structure containing site deficiency, a phase of 2H structure containing site deficiency, η' phase of monoclinic crystal containing site deficiency, and a phase having $DO_3$ structure containing site deficiency. Hereinafter, these δ phase, ε phase, η' phase, and phase having $DO_3$ structure, each containing site deficiency, are also referred to as "site deficient phase". Here, "site deficiency" means a state of a crystal structure in which occupancy factor is less than 1 in a specific atomic site.

These site deficient phases include a plurality of site deficiencies in the crystal structure. These site deficiencies function as a storage site or a diffusion site of metal ions (such as Li ions). Therefore, if a powder material contains an alloy phase which becomes 2H structure after M transformation and becomes $DO_3$ structure after reverse transformation, and at least one phase among the above described site deficient phases, the volumetric discharge capacity and the cycle characteristics of the negative electrode active material are further improved.

The chemical composition of a specific alloy phase may further contain a Group 2 element and/or rare earth metal (REM) for the purpose of increasing discharge capacity. The Group 2 elements include, for example, magnesium (Mg) calcium (Ca) and the like. REMs include, for example, lanthanum (La), cerium (Ce), praseodymium (Pr), neodymium (Nd) and the like.

If a specific alloy phase contains a Group 2 element and/or REM, the powder material becomes brittle. Therefore, in the production process of the electrode, a bulk material or an ingot made of the powder material is easy to be pulverized, making it easy to produce an electrode.

The powder material may be made up of the above described specific alloy phase, or may contain the above described specific alloy phase and another active material phase which is metal ion-active. Another active material phase includes, for example, a tin (Sn) phase, a silicon (Si) phase, an aluminum (Al) phase, a Co—Sn alloy phase, a $Cu_6Sn_5$ compound phase (η' phase or η phase) and the like.

[Volume Expansion Ratio and Volume Contraction Ratio of Specific Alloy Phase]

When the above described specific alloy phase undergoes M transformation or reverse transformation along with occlusion and release of metal ions, preferable volume expansion/contraction ratio of unit cell of the specific alloy phase is not more than 20%. In this case, it is possible to sufficiently relax the strain due to a volume change which occurs following occlusion and release of metal ions. The volume expansion/contraction ratio of unit cell of the specific alloy phase is more preferably not more than 10%, and further preferably not more than 5%.

The volume expansion/contraction ratio of the specific alloy phase can be measured by an in-situ X-ray diffraction during charging/discharging. To be more specific, an electrode plate of negative electrode active material, a separator, a counter electrode lithium, and electrolytic solution are placed and sealed in a dedicated charge/discharge cell equipped with a window made of beryllium which transmits X-ray, within a glove box in pure argon gas atmosphere in which moisture is controlled such that due point is not more than −80° C. Then, this charge/discharge cell is mounted onto the X-ray diffraction apparatus. After mounting, an X-ray diffraction profile of the specific alloy phase is obtained in each of an initially charged state and an initially discharged state in the course of charging and discharging. From this X-ray diffraction profile, a lattice constant of the specific alloy phase is found. From the lattice constant, it is possible to calculate the volume change ratio in consideration of crystal lattice correspondence of the specific alloy phase.

When the shape of X-ray diffraction profile changes due to full width at half maximum etc. in the charge-discharge cycling process, analysis is performed after repeating charging and discharging 5 to 20 times as needed. Then, an average value of volume change ratio is found from a plurality of X-ray diffraction profiles having high reliability.

[Analysis Method of Crystal Structure of Alloy Phase Contained by Negative Electrode Active Material]

(1) The crystal structure of the phase (including an alloy phase) contained in the negative electrode active material can be analyzed by Rietveld method based on the X-ray diffraction profile obtained by using an X-ray diffraction apparatus. To be more specific, the crystal structure is analyzed by the following method.

For a negative electrode active material before use for a negative electrode, X-ray diffraction measurement is performed on the negative electrode active material to obtain measured data of X-ray diffraction profile. Based on the obtained X-ray diffraction profile (measured data), the configuration of phases in the negative electrode active material is analyzed by Rietveld method. For the analysis by Rietveld method, either of "RIETAN2000" (program name) or "RIETAN-FP" (program name) which are general-purpose analysis software is used.

(2) The crystal structure of a negative electrode active material in a negative electrode before charging in a battery is determined by the same method as that in (1). To be more specific, the battery, which is in an uncharged state, is disassembled within the glove box in argon atmosphere, and the negative electrode is taken out from the battery. The negative electrode taken out is enclosed with Myler foil. Thereafter, the perimeter of the Myler foil is sealed by a thermocompression bonding machine. Then, the negative electrode sealed by the Myler foil is taken out of the glove box.

Next, a measurement sample is fabricated by bonding the negative electrode to a reflection-free sample plate (a plate of a silicon single crystal which is cut out such that a specific crystal plane is in parallel with the measurement plane) with hair spray. The measurement sample is mounted onto the X-ray diffraction apparatus and X-ray diffraction measurement of the measurement sample is performed to obtain an X-ray diffraction profile. Based on the obtained X-ray diffraction profile, the crystal structure of the negative electrode active material in the negative electrode is determined by Rietveld method.

(3) Crystal structures of the negative electrode active material in the negative electrode after charging one to multiple times and after discharging one to multiple times are determined by the same method as that in (2).

To be more specific, the battery is fully charged in a charging/discharging test apparatus. The fully charged battery is disassembled in the glove box, and a measurement sample is fabricated by the same method as that in (2). The measurement sample is mounted onto the X-ray diffraction apparatus and X-ray diffraction measurement is performed.

Moreover, the battery is fully discharged, and the fully discharged battery is disassembled in the glove box and a measurement sample is fabricated by the same method as that in (2) to perform X-ray diffraction measurement.

[Making Thickness of Surface Oxide Layer not More than 10 nm]

The powder material has an oxide layer on the surface thereof. The thickness of the oxide layer is not more than 10 nm. Making the thickness of the oxide layer not more than 10 nm will increase the capacity retention ratio and also improve the charge-discharge cycle characteristics. A possible reason of this is considered as follows.

In an alloy-based active material, a film made from a combination of a metal ion (Li, etc.), a constituting element of an alloy phase, and oxygen (for example, Li—Sn—O combination) is likely to be formed on the surface of the material at the time of charging and discharging. This film inhibits the movement of the Li ion associated with charging/discharging. Hereinafter, such a film is referred to as a "reaction inhibiting film". As the thickness of such reaction inhibiting film increases, the degree of inhibiting the occlusion and release of Li etc. increases. For that reason, the discharge capacity remarkably decreases, and the cycle life decreases. In the negative electrode active material of the present embodiment, the thickness of the oxide layer on the surface of the material is made not more than 10 nm to suppress the growth of such reaction inhibiting film. Since the thickness of the oxide layer is small, the supply amount of oxygen to the reaction inhibiting film is small, thus suppressing the growth of the reaction inhibiting film. The thickness of the oxide layer is preferably not more than 5 nm.

The oxygen concentration in the oxide layer of the surface is generally highest at the surface, and exhibits a concentration gradient decreasing in the depth direction, eventually reaching a constant value at a certain depth. In the present description, the oxide layer of the surface refers to a layer having a thickness corresponding to a half of the depth at which the oxygen concentration becomes constant when the alloy powder is subjected to quantitative analysis of oxygen from the surface in the depth direction. The thickness of the oxide layer of the surface can be measured by, for example, Auger electron spectroscopy. In this case, first, a relatively flat region of power particles of a size of several tens μm is selected in an scanning electron microscope mode, and an electron beam is reduced to detect the intensity of Auger electrons resulted from oxygen from a region of a several μm square. An intensity profile in the depth direction can be obtained by subjecting a specimen to argon ion sputtering to remove a fixed thickness in the depth direction by grinding, and then to measurement by Auger electron spectroscopy, and repeating these processes. From the obtained profile, the thickness of layer of the oxide film is determined as the distance to a position corresponding to a half of the intensity at the outer most surface.

[Making Oxygen Concentration in Surface Oxide Layer not More than 70 at %]

The oxygen concentration in the oxide layer of material surface is preferably not more than 70 at %. This makes it possible to further suppress the formation of a reaction inhibiting film. This makes it possible to further suppress the decrease in the discharge capacity due to repetition of charging and discharging. The oxygen concentration is more preferably not more than 50 at %. A lower limit of the oxygen concentration is, for example, 10 at %.

<Production Method of Negative Electrode Active Material>

A production method of a negative electrode active material, which contains the above-described specific alloy phase, and has an oxide layer of a specific thickness, will be described.

Molten metal which is the raw material of the powder material containing the specific alloy phase is produced. For example, molten metal having the above described chemical composition is produced. The molten metal is produced by melting starting material by an ordinary melting method such as arc melting or resistance heating melting. Next, an ingot (bulk alloy) is produced by an ingot casting method by using the molten metal.

Alternatively, a thin cast piece or particle is produced, preferably by subjecting the molten metal to rapid solidification. This method is called a rapid solidification method. Examples of the rapid solidification method include a strip casting method, a melt-spinning method for producing ribbons, a gas atomization method, a melt spinning method for producing fibers, a water atomization method, an oil atomization method, and the like.

The bulk alloy (ingot) obtained by melting is (1) cut, (2) coarsely crushed by a hammer mill etc., or (3) finely pulverized mechanically by a ball mill, an attritor, a disc mill, a jet mill, a pin mill, and the like to produce the powder material which is adjusted into a necessary particle size. When the bulk alloy has ductility and ordinary pulverization is difficult, the bulk alloy may be subjected to cutting and pulverization by a grinder disc, which is embedded with diamond abrasive particles, and the like. When M phase due to stress induction is formed in these pulverization processes, the formation ratio thereof is adjusted as needed by appropriately combining the alloy design, heat treatment, and pulverization conditions thereof. When powder generated by an atomization method can be used as melted or as heat treated, there may be cases where no pulverization process is particularly needed. Moreover, when melted material is obtained by a strip casting method and crushing thereof is difficult due to its ductility, the melted material is adjusted to have a predetermined size by being subjected to mechanical cutting such as shearing. Moreover, in such a case, the melted material may be heat treated in a necessary stage, to adjust the ratio between M phase and a matrix phase, and the like.

When the powder material is heat treated to adjust the constitution ratio, etc. of the specific alloy phase, the powder material may be rapidly cooled after being retained at a predetermined temperature for a predetermined time period in inert atmosphere as needed. In this occasion, the cooling rate may be adjusted by selecting a quenching medium such as water, salt water with ice, oil, and liquid nitrogen according to the size of the powder material, and setting the quenching medium to a predetermined temperature. Moreover, immediately after the quenching, liquid nitrogen sub-zero treatment may be performed. This liquid nitrogen sub-zero treatment allows preparation of the constitution ratio of the specific alloy phase, and adjustment of martensite transformation temperature.

The thickness of the oxide layer of the surface of the powder material is made not more than 10 nm, and preferably, for example at least any of the followings is performed to make the oxygen concentration in the oxide layer not more than 70 at %.

In the production process of molten metal, the oxygen concentration in the atmospheric gas is made not more than 5000 ppm, and preferably not more than 1000 ppm.

The atmosphere in the process of solidification is made to be a vacuum atmosphere or an inert gas atmosphere, in which the oxygen content is reduced as much as possible.

The atmosphere in the pulverization process is made to be an inert gas atmosphere in which the oxygen content is reduced as much as possible.

The atmosphere in the heat treatment process for adjusting the constitution ratio, etc. of the specific alloy phase is made to be an inert gas atmosphere, a vacuum atmosphere, or a reducing atmosphere, in which the oxygen content is reduced as much as possible.

Through the above described processes, a negative electrode active material containing the above described plurality of powder materials is produced.

<Production Method of Negative Electrode>

A negative electrode using a negative electrode active material relating to an embodiment of the present invention can be produced by a method well known to those skilled in the art.

For example, a binder such as polyvinylidene fluoride (PVDF), polymethyl methacrylate (PMMA), polytetrafluoroethylene (PTFE), and styrene-butadiene rubber (SBR) is admixed to powder of a negative electrode active material of an embodiment of the present invention, and further carbon material powder such as natural graphite, artificial graphite, and acetylene black is admixed thereto to impart sufficient conductivity to the negative electrode. After being dissolved by adding a solvent such as N-methylpyrrolidone (NMP), dimethylformamide (DMF) and water, the binder is stirred well using a homogenizer and glass beads if necessary, and formed into a slurry. This slurry is applied on an active substance support member such as a rolled copper foil and an electrodeposited copper foil and is dried. Thereafter, the dried product is subjected to pressing. Through the above described processes, a negative electrode plate is produced.

The amount of the binder to be admixed is preferably about 5 to 10 mass % from the viewpoint of the mechanical strength and battery characteristics of the negative electrode. The support member is not limited to a copper foil. The support member may be, for example, a foil of other metals such as stainless steel and nickel, a net-like sheet punching plate, a mesh braided with a metal element wire and the like.

The particle size of the powder of negative electrode active material affects the thickness and density of electrode, that is, the capacity of electrode. The thickness of electrode is preferably as thin as possible. This is because a smaller thickness of electrode can increase the total surface area of the negative electrode active material included in a battery. Therefore, an average particle size of the powder of negative electrode active material is preferably not more than 100 μm. As the average particle size of the powder of negative electrode active material decreases, the reaction area of the powder increases, thereby resulting in excellent rate characteristics. However, when the average particle size of the powder of negative electrode active material is too small, the properties and condition of the surface of the powder change due to oxidation etc. so that it becomes difficult for lithium ions to enter into the powder. In such a case, the rate characteristics and the efficiency of charging/discharging may decline over time. Therefore, the average particle size of the powder of negative electrode active material is preferably 0.1 to 100 μm, and more preferably 1 to 50 μm.

<Production Method of Battery>

A nonaqueous electrolyte secondary battery according to the present embodiment includes the negative electrode as described above, a positive electrode, a separator, and an electrolytic solution or electrolyte. The shape of the battery may be a cylindrical type, a square shape as well as a coin type and a sheet type. The battery of the present embodiment may be a battery utilizing a solid electrolyte such as a polymer battery and the like.

The positive electrode of the battery of the present embodiment preferably contains a transition metal compound containing a metal ion as the active material. More preferably, the positive electrode contains a lithium (Li)-containing transition metal compound as the active material. An example of the Li-containing transition metal compound is $LiM_{1-x}M'xO_2$, or $LiM_2yM'O_4$. Where, in the chemical formulae, $0 \leq x$, $y \leq 1$, and M and M' are respectively at least one kind of barium (Ba), cobalt (Co), nickel (Ni), manganese (Mn), chromium (Cr), titanium (Ti), vanadium (V), iron (Fe), zinc (Zn), aluminum (Al), indium (In), tin (Sn), scandium (Sc) and yttrium (Y).

However, the battery of the present embodiment may use other positive electrode materials such as transition metal chalcogenides; vanadium oxide and lithium (Li) compound thereof; niobium oxide and lithium compound thereof; conjugated polymers using organic conductive substance; Shepureru phase compound; activated carbon; activated carbon fiber; and the like.

The electrolytic solution of the battery of the present embodiment is generally a nonaqueous electrolytic solution in which lithium salt as the supporting electrolyte is dissolved into an organic solvent. Examples of lithium salt include $LiClO_4$, $LiBF_4$, $LiPF_6$, $LiAsF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, LiCl, LiBr, and LiI. These may be used singly or in combination. The organic solvent is preferably carbonic ester, such as propylene carbonate, ethylene carbonate, ethyl methyl carbonate, dimethyl carbonate, and diethyl carbonate. However, other various kinds of organic solvents including carboxylate ester and ether are usable. These organic solvents may be used singly or in combination.

The separator is placed between the positive electrode and the negative electrode. The separator serves as an insulator. Further, the separator greatly contributes to the retention of electrolyte. The battery of the present embodiment may include a well known separator. The separator is made of, for example, polypropylene or polyethylene, which is polyolefin-based material, or mixed fabric of the two, or a porous body such as a glass filter. The above described negative electrode, positive electrode, separator, and electrolytic solution or electrolyte are accommodated in a container to produce a battery.

Hereinafter, the negative electrode active material, the negative electrode, and the battery of the present embodiment described above will be described in more detail by using Examples. It is noted that the negative electrode active material, the negative electrode, and the battery of the present embodiment will not be limited to Examples shown below.

EXAMPLES

Powdered negative electrode active materials, negative electrodes, and coin batteries of Inventive Examples 1 to 5 of the present invention and Comparative Examples 1 to 3 shown in Table 1 were produced by the following method. Then, changes in the crystal structure of each negative electrode active material caused by charging/discharging were confirmed. Further, discharge capacity (discharge capacity per volume) and cycle characteristics of each battery were investigated.

TABLE 1

|  | Chemical composition | Production conditions (Conditions for adjusting oxide layer thickness and oxygen concentration in oxide layer) | | | Atomic | Battery characteristics | | |
|---|---|---|---|---|---|---|---|---|
|  |  | Oxygen quantity in melting atmosphere (vol-ppm) | Oxygen concentration in pulverization atmosphere (vol %) | Temperature of pulverization atmosphere (° C.) | Thickness of surface oxide layer (nm) | concentration of oxygen in surface oxide layer (%) | Initial discharge capacity (mAh/cm³) | Discharge capacity at 20th cycle (mAh/cm³) | Capacity retention ratio (%) |
| Inventive Example 1 | (1) Cu-23at % Sn-5at % Si | 500 | 0.1 | 20 | 1.3 | 22.5 | 2078 | 2032 | 97.8 |
| Inventive Example 2 | (1) Cu-23at % Sn-5at % Si | 500 | 1.0 | 20 | 1.5 | 24.4 | 2220 | 2172 | 97.8 |
| Inventive Example 3 | (1) Cu-23at % Sn-5at % Si | 500 | 4.0 | 20 | 2.0 | 42.7 | 1917 | 1796 | 93.7 |
| Comparative Example 1 | (1) Cu-23at % Sn-5at % Si | 500 | 21.0 | 40 | 12.0 | 72.1 | 1624 | 1246 | 76.7 |
| Inventive Example 4 | (2) Cu-20at % Sn-10at % Al | 500 | 0.1 | 20 | 1.1 | 21.8 | 2145 | 2063 | 96.2 |
| Comparative Example 2 | (2) Cu-20at % Sn-10at % Al | 500 | 21.0 | 40 | 12.9 | 73.4 | 1549 | 1178 | 76.0 |
| Inventive Example 5 | (3) Cu-25at % Sn | 500 | 0.1 | 20 | 0.9 | 20.6 | 2089 | 1956 | 93.6 |
| Comparative Example 3 | (3) Cu-25at % Sn | 500 | 21.0 | 40 | 13.4 | 74.6 | 1479 | 1026 | 69.4 |

Inventive Example 1 of the Present Invention

[Production of Negative Electrode Active Material]

A mixture of a plurality of starting materials (elements) was high-frequency melted in a nozzle made of boron nitride in argon gas atmosphere to produce molten metal such that the final chemical composition of the negative electrode active material becomes the chemical composition listed in the "chemical composition" column in Table 1. The oxygen concentration in the argon gas atmosphere was as listed in Table 1.

A rapidly solidified foil band was produced by spraying the molten metal onto a rotating copper roll. The thickness of the foil band was 20 to 40 µm. This foil band was pulverized by a grinding machine (automatic mortar) into alloy powder of a size of not more than 45 µm. At this moment, the automatic mortar was put into a glove box and the oxygen concentration in the pulverization atmosphere, and the atmospheric temperature were adjusted as shown in Table 1. This alloy powder was used as the negative electrode active material. The final chemical composition of this negative electrode active material was as listed in the "chemical composition" column in Table 1. To be specific, the chemical composition of the alloy powder contained 23 at % of Sn and 5 at % of Si, with the balance being Cu.

[Production of Negative Electrode]

The above powdered negative electrode active material, acetylene black (AB) as a conductive assistant, styrene-butadiene rubber (SBR) as a binder (2-fold dilution), and carboxymethylcellulose (CMC) as a thickening agent were mixed in a mass ratio of 75:15:10:5 (blending quantity was 1 g:0.2 g:0.134 g:0.067 g). Then, a kneading machine was used to produce a negative electrode compound slurry by adding distilled water to the mixture such that slurry density was 27.2%. Since the styrene-butadiene rubber was used by being diluted 2-fold with water, 0.134 g of styrene-butadiene rubber was blended when weighing.

The produced negative electrode compound slurry was applied on a metal foil by using an applicator (150 μm). The metal foil applied with the slurry was dried at 100° C. for 20 minutes. The metal foil after drying had a coating film made up of the negative electrode active material on the surface. The metal foil having the coating film was subjected to punching to produce a disc-shaped metal foil having a diameter of 13 mm. The metal foil after punching was pressed at a press pressure of 500 kgf/cm$^2$ to produce a plate-shaped negative electrode material. In negative electrodes to be used for the evaluation and measurement of the negative electrode active material other than the determination of crystal structure, the metal foil was copper foil. In a negative electrode to be used for the determination of crystal structure, the metal foil was nickel foil.

[Production of Battery]

The produced negative electrode, EC-DMC-EMC-VC-FEC as the electrolytic solution, a polyolefin separator (φ7 mm) as the separator, and a metal Li plate (φ19×1 mmt) as the positive electrode material were prepared. Thus prepared negative electrode, the electrolytic solution, the separator, and the positive electrode were used to produce a coin battery of 2016 type. Assembly of the coin battery was performed within a glove box in argon atmosphere.

[Measurement of Thickness of Surface Oxide Layer and Atomic Concentration of Oxygen in Surface Oxide Layer]

As described above, the oxide layer refers to a layer having a thickness corresponding to a half of the depth at which the oxygen concentration becomes constant when the alloy powder is subjected to quantitative analysis of oxygen from the surface in the depth direction.

The thickness of surface oxide layer, and the atomic concentration of oxygen in the surface oxide layer were determined by creating a depth direction profile of oxygen under the following conditions by using a micro-Auger electron spectroscopic analysis apparatus.

Apparatus: Model 680 manufactured by ULVAC-PHI, Inc.

Primary beam: Acceleration voltage of 10 kV, and sample current of 10 nA

Sputtering: Ar ion, acceleration voltage of 3 kV, sputtering speed of 1.1 nm/min ($SiO_2$ conversion)

A conversion value from Argon sputtering rate of $SiO_2$ was used for determining the distance in the depth direction. Moreover, for the determination of oxygen concentration, Auger peak intensities of energy corresponding to each of the constituting elements of the negative electrode material, and oxygen were measured in the depth direction, and converted into atomic %. As a result of this, values of the oxygen concentration of the surface, and the thickness of the above described oxide layer were obtained, respectively. In this occasion, although carbon is detected due to contamination of the surface, that part is treated as an excluded number, and excluded when converting analysis values.

[Determination of Crystal Structure]

The crystal structures of the powdered negative electrode active material before use for the negative electrode, the crystal structures of the negative electrode active material in the negative electrode before initial charging, and the crystal structures of the negative electrode active material in the negative electrode after one to 20 times of charging and discharging were determined by the following method. X-ray diffraction measurements were carried out for the target negative electrode active materials to obtain measured data. Then, based on the obtained measured data, crystal structures included in the target negative electrode active materials were determined by Rietveld method. More specifically, the crystal structures were determined by the following method.

(1) Crystal Structure Analysis of Powdered Negative Electrode Active Material Before Use in Negative Electrode X-ray diffraction measurements were carried out for the powder (not more than 45 μm) of the negative electrode active materials before use in the negative electrode to obtain measured data of X-ray diffraction profile.

To be specific, SmartLab (product of Rigaku Co., Ltd) (rotor target maximum output 9 KW; 45 kV-200 mA) was used to obtain X-ray diffraction profiles of the powder of the negative electrode active materials.

Figure 3:
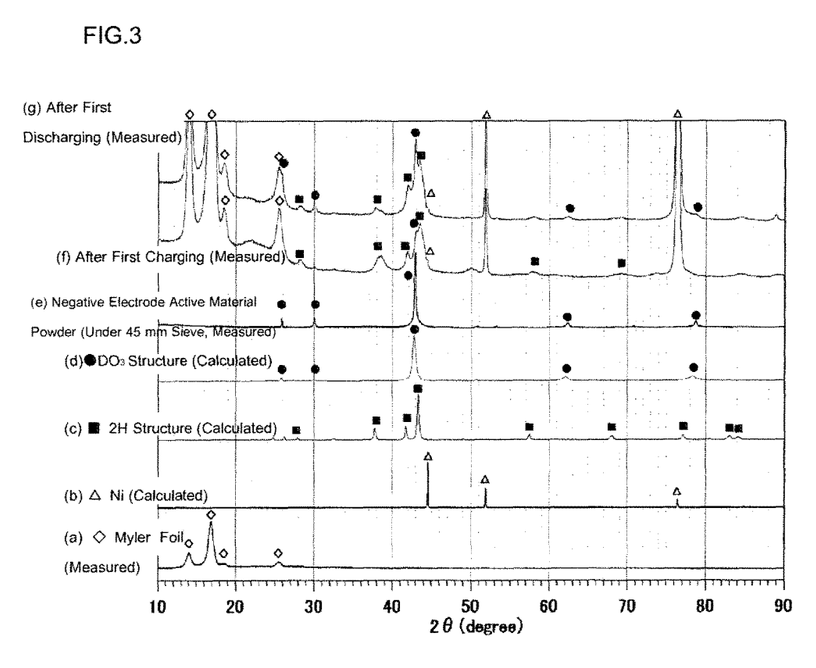
FIG. 3 is a diagram illustrating an X-ray diffraction profiles before and after charging-discharging of the alloy phase of Inventive Example 1 of the present invention, and simulation results by Rietveld method.

Based on the obtained X-ray diffraction profiles (measured data: FIG. 3 (e)), crystal structures of alloy phases in the negative electrode active material were analyzed by Rietveld method.

Figure 2A:
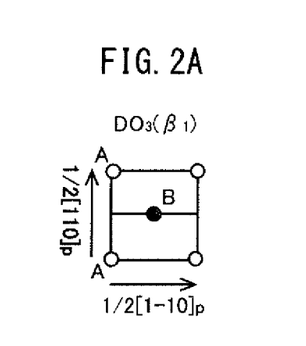
FIG. 2A is a schematic diagram of $DO_3$ structure of the matrix phase of the alloy phase of the present embodiment.

The $DO_3$ ordered structure is an ordered structure as shown in FIG. 2A. In a Cu—Sn base alloy, mainly Cu is present at atomic sites shown by a black circle and mainly Sn is present at atomic sites shown by a white circle, in FIG. 2A. Respective sites may be replaced by addition of a third element. It is known that such a crystal structure falls into No. 225 (Fm-3m) of International Table (Volume-A) in the classification of space group representation. The lattice constant and atomic coordinates of this space group number are as shown in Table 2.

TABLE 2

Parent phase ($β_1$ Phase), Crystal Structure: $DO_3$
Space Group Number (International Table A): No. 225 (Fm-3m)
Lattice Constant: a = 6.05 Å

| Site Name | Atomic Species | Multiplicity/ Wyckoff Symbol | Atomic Coordinates | | |
|---|---|---|---|---|---|
| | | | x | y | z |
| Sn1 | Sn | 4a | 0.0 | 0.0 | 0.0 |
| Cu1 | Cu | 8c | 1/4 | 1/4 | 1/4 |
| Cu2 | Cu | 4b | 1/2 | 1/2 | 1/2 |

Accordingly, with the structure model of this space group number being as the initial structure model of Rietveld analysis, a calculated value of diffraction profile (hereinafter, referred to as a calculated profile) of $β_1$ phase ($DO_3$ structure) of this chemical composition was found by Rietveld method. RIETAN-FP (program name) was used for Rietveld analysis.

Further, a calculated profile of the crystal structure of $γ_1'$ phase was found as well. The crystal structure of $γ_1'$ was 2H structure in the notation of Ramsdell symbol, and the space group was No. 59-2 (Pmmn) of International Table (Volume-A). The lattice constant and atomic coordinates of No. 59-2 (Pmmn) are shown in Table 3.

TABLE 3

M Phase ($\gamma_1$' Phase), Crystal Structure: 2H
Space Group Number (International Table A): No. 59-2 (Pmmn)
Lattice Constants: a = 4.379 Å, b = 5.498 Å, c = 4.615 Å

| Site Name | Atomic Species | Multiplicity/ Wyckoff Symbol | Atomic Coordinates | | |
|---|---|---|---|---|---|
| | | | x | y | z |
| Sn1 | Sn | 2b | 1/4 | 3/4 | 1/6 |
| Cu1 | Cu | 2a | 1/4 | 1/4 | 1/6 |
| Cu2 | Cu | 4e | 1/4 | 0.0 | 2/3 |

A calculated profile was found by using RIETAN-FP supposing that the crystal structure of the space group number of the above describe Table 3 be the initial structure model of Rietveld analysis. In FIG. 3, (d) shows a calculated profile of DO$_3$ structure, and (c) shows a calculated profile of 2H structure.

A result of the analysis revealed that a $\beta_1$ phase (DO$_3$ structure) which is the matrix phase of a $\gamma_1$' phase (2H structure) which is a kind of M phase, is present singly in the negative electrode active material of Inventive Example 1.

(2) Crystal Structure Analysis of Negative Electrode Active Material in Negative Electrode The crystal structure of a negative electrode active material in a negative electrode before charging was also determined by the same method as that in (1). A measured X-ray diffraction profile was measured by the following method.

The above described coin battery, which was before being charged, was disassembled within the glove box in argon atmosphere, and a plate-shaped negative electrode (including nickel foil) was taken out from the coin battery. The negative electrode taken out was enclosed in Myler foil (manufactured by DuPont). Thereafter, the perimeter of the Myler foil was sealed by a thermocompression bonding machine. Then, the negative electrode sealed by the Myler foil was taken out of the glove box.

Next, a measurement sample was fabricated by bonding the negative electrode to a reflection-free sample plate manufactured by Rigaku Co., Ltd. (a plate of a silicon single crystal which was cut out such that a specific crystal plane was in parallel with the measurement plane) with a hair spray.

The measurement sample was mounted onto the X-ray diffraction apparatus described below in (4), and the X-ray diffraction measurement of the measurement sample was performed under measurement conditions described below in (4).

(3) Analysis of Crystal Structure of Negative Electrode Active Material in Negative Electrode after Charging and after Discharging The crystal structure of the negative electrode active material in the negative electrode after one to 20 times of charging and after one to 20 times of discharging was also determined by the same method as that in (1). Measured X-ray diffraction profiles were measured by the following method.

The above described coin battery was fully charged in a charging/discharging test apparatus. The fully charged coin battery was disassembled in the glove box, and a measurement sample was fabricated by the same method as that in (2). The measurement sample was mounted onto the X-ray diffraction apparatus described below in (4), and X-ray diffraction measurement of the measurement sample was performed under measurement conditions described below in (4).

Moreover, the above described coin battery was fully discharged. The fully discharged coin battery was disassembled in the glove box, and a measurement sample was fabricated by the same method as in (3). The measurement sample was mounted onto the X-ray diffraction apparatus described below in (4), and X-ray diffraction measurement of the measurement sample was performed at measurement conditions described below in (4).

For a negative electrode which had been subjected to charging and discharging repeatedly in a coin battery, X-ray diffraction measurement was performed by the same method.

(4) X-Ray Diffraction Apparatus and Measurement Conditions

Apparatus: SmartLab manufactured by Rigaku Co., Ltd.
X-ray tube: Cu-K$\alpha$ ray
X-ray output: 45 kV, 200 mA
Incident monochrometer: Johannson-type crystal (which filters out Cu-K$\alpha_2$ ray and Cu-K$u$ ray)
Optical system: Bragg-Brentano geometry
Incident parallel slit: 5.0 degrees
Incident slit: ½ degree
Length limiting slit: 10.0 mm
Receiving slit 1: 8.0 mm
Receiving slit 2: 13.0 mm
Receiving parallel slit: 5.0 degrees
Goniometer: SmartLab goniometer
X-ray source—mirror distance: 90.0 mm
X-ray source—selection slit distance: 114.0 mm
X-ray source—sample distance: 300.0 mm
Sample—receiving slit 1 distance: 187.0 mm
Sample—receiving slit 2 distance: 300.0 mm
Receiving slit 1—receiving slit 2 distance: 113.0 mm
Sample—detector distance: 331.0 mm
Detector D/Tex Ultra
Scan range: 10 to 120 degrees or 10 to 90 degrees
Scan step: 0.02 degrees
Scan mode: Continuous scan
Scanning speed: 2 degrees/min or 2.5 degrees/min (5) Analysis Results of X-Ray Diffraction Measurement Data X-ray diffraction data obtained in (1) and (3) are shown in FIG. 3. In FIG. 3, (e) is an X-ray diffraction profile of powder of a negative electrode active material, which was found in (1). In the figure, (f) is an X-ray diffraction profile of the negative electrode active material after first charging; and (g) is an X-ray diffraction profile after first discharging. Reference symbol (a) in FIG. 3 indicates a measured X-ray diffraction profile in which similar X-ray diffraction is performed on a Myler film alone. Reference symbol (b) in FIG. 3 indicates an X-ray diffraction profile of Ni, which is calculated to identify diffraction lines of Ni foil used for the current collector. Reference symbol (c) in FIG. 3 indicates a calculated profile of 2H structure in the chemical composition of the present example, and reference symbol (d) in FIG. 3 indicates a calculated profile of DO$_3$ structure in the chemical composition of the present example.

(5-1)

From the X-ray diffraction data obtained in (1) and (2), it can be confirmed that no significant reaction has occurred between the negative electrode active material and the electrolytic solution.

(5-2)

X-ray diffraction profiles of the "negative electrode active material after charging" (FIG. 3(*e*)) and the "negative electrode active material after discharging" (FIG. 3(*f*)) were compared with each other. As a result, the diffraction line repeatedly changed in a reversible manner at a position where the diffraction angle 2θ is near 43.3° (position caused by M phase ($\gamma_1'$ phase))(hereinafter, referred to as a strongest diffraction line of M phase). That is, a structural change was exhibited.

(5-3)

Accordingly, the crystal structures of the "negative electrode active material after charging" and the "negative electrode active materials after discharging" were determined by using Rietveld method.

Figure 1:
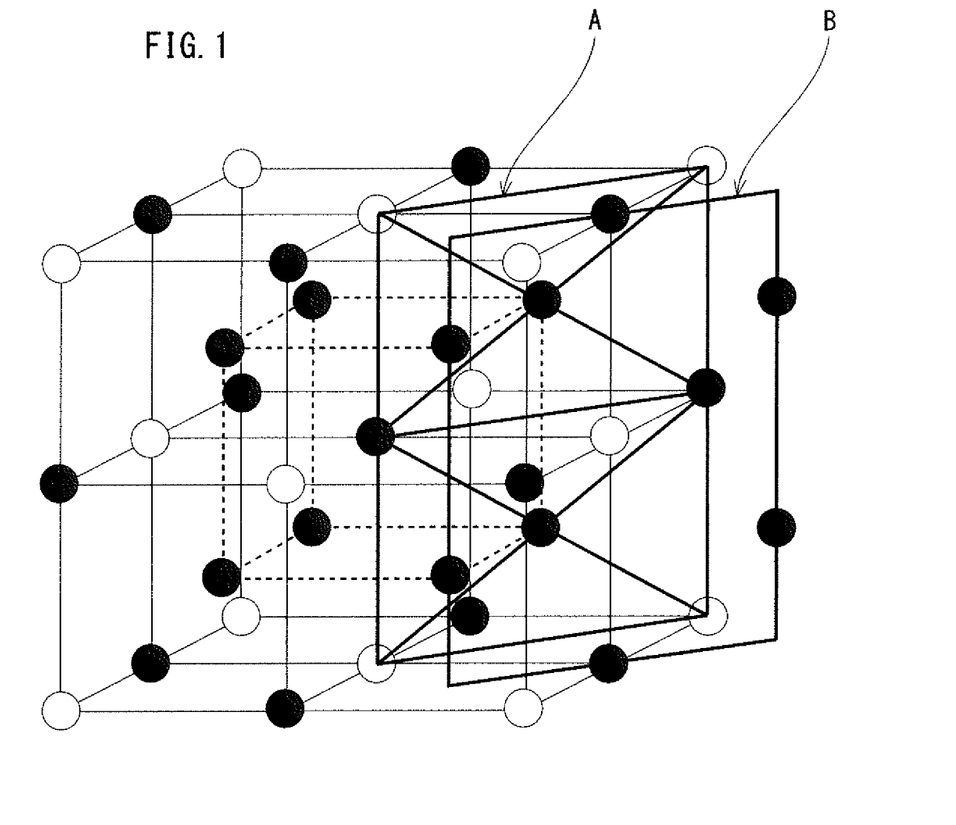
FIG. 1 is a perspective view of $DO_3$ structure.
Figure 2B:
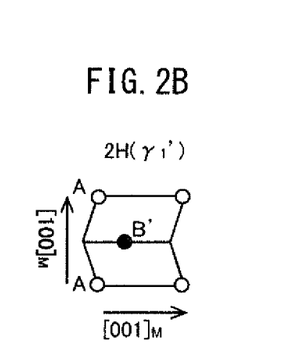
FIG. 2B is a schematic diagram of 2H structure of γ1' phase which is a kind of martensite phase.
Figure 2C:
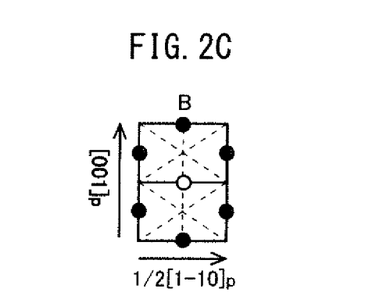
FIG. 2C is a schematic diagram of a crystal plane to explain thermoelastic diffusionless transformation from $DO_3$ structure to 2H structure.
Figure 2D:
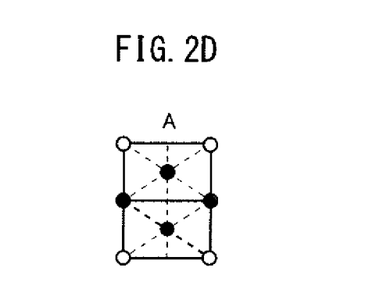
FIG. 2D is a schematic diagram of another crystal plane different from that of FIG. 2C.
Figure 2E:
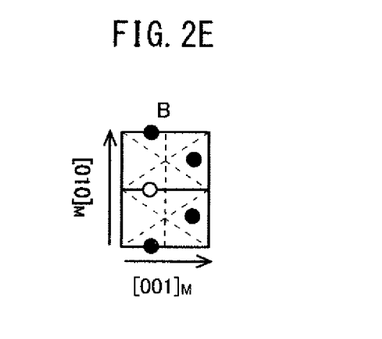
FIG. 2E is a schematic diagram of another crystal plane different from those of FIGS. 2C and 2D.

For example, in the negative electrode active material, the crystal plane A shown in FIG. 2D and the crystal plane B shown in FIG. 2C are alternately layered in the $DO_3$ structure of the matrix phase shown in FIGS. 1 and 2A. When a phase transformation occurs between the $DO_3$ structure and $\gamma_1'$ phase which is a kind of M phase, as shown in FIGS. 2A and 2B, the crystal plane B regularly undergoes shuffling due to shear stress, thereby being displaced to the position of crystal plane B'. In this case, phase transformation (M transformation) occurs without diffusion of the host lattice. In the 2H structure after M transformation, the crystal plane A shown in FIG. 2D and the crystal plane B' shown in FIG. 2E are alternately layered.

Then, it was judged whether the crystal structure of the negative electrode active material in the negative electrode of the present example involved M transformation or was not accompanied thereby (that is, involved diffusion of host lattice at the time of charging/discharging) by comparing the measured data of the X-ray diffraction profiles of the negative electrode active material after charging and after discharging, the calculated profile of $\beta_1$ phase ($DO_3$ structure) (FIG. 3(d): 2θ angle positions of representative diffraction lines are denoted by ● (black circle) symbols), and the calculated profile of $\gamma_1'$ phase (2H structure) (FIG. 3(c): 2θ angle positions of representative diffraction lines are denoted by ■ (black square) symbols).

Referring to FIG. 3 (f), in the X-ray diffraction profile, the intensity of the strongest diffraction line of M phase of near 43.5° increased as a result of initial charging, and decreased as a result of consecutive discharging. It can be judged that this diffraction line resulted from the formation of M phase ($\gamma_1'$) by M transformation, as will be next described, from calculated profiles of RIETAN-FP).

To be specific, as shown in (f), in the 2H structure, there were increases in some of the peak intensities of 2θ angle positions (■(black square) symbol) corresponding to the 2H structure of FIG. 3(c) including the strongest diffraction line of M phase at 43.5° in the X-ray diffraction profile after the first charging. On the other hand, there were decreases in some of the peak intensities of ● (black circle) symbol corresponding to $DO_3$ structure. In particular, intensity peaks near 43.5° did not appear in the X-ray profile (simulation result) of any crystal structure other than 2H. For X-ray diffraction of a constituting member other than active material, which appears during measurement, a measured diffraction profile of a Myler foil and a calculated profile of nickel of the current collector are shown by (a) and (b) in FIG. 3 respectively, in which 2θ angle positions of major diffraction lines are indicated by ◇ symbols and Δ symbols, respectively. Since diffraction lines resulted from these members appear in the measured profiles of (f) and (g) in FIG. 3, corresponding positions are indicated by ◇ (white rhombus) symbols and A (white triangle) symbols.

From the above, the negative electrode of the present Example contained an alloy phase which underwent M transformation to become M phase (2H structure) as a result of charging, and became a matrix phase ($DO_3$ structure) as a result of discharging. That is, the negative electrode of the present Example contained an alloy phase which underwent M transformation when occluding lithium ions which are metal ions, and underwent reverse transformation when releasing lithium ions.

In the negative electrode of the present Example, M transformation at the time of charging, and reverse transformation at the time of discharging were repeated.

The full width at half maximum of a diffraction line decreased along with charge-discharge cycles. From this, it is considered that occlusion and release of lithium ions relaxed strain of the negative electrode active material.

[Charge-Discharge Performance Evaluation of Coin Battery]

Next, discharge capacity and cycle characteristics of the battery of Inventive Example 1 were evaluated.

Constant current doping (corresponding to the insertion of lithium ions into electrode, and the charging of lithium ion secondary battery) was performed to a coin battery at a current value of 0.1 mA (a current value of 0.075 mA/cm$^2$) or a current value of 1.0 mA (a current value of 0.75 mA/cm$^2$) until the potential difference against the counter electrode becomes 0.005 V. Thereafter, doping capacity was measured by continuing doping against the counter electrode at a constant voltage until the current value became 7.5 μA/cm$^2$ while retaining 0.005 V.

Next, de-doping capacity was measured by performing de-doping (which corresponds to desorption of lithium ions from the electrode, and discharge of the lithium ion secondary battery) at a current value of 0.1 mA (a current value of 0.075 mA/cm$^2$) or a current value of 1.0 mA (a current value of 0.75 mA/cm$^2$) until the potential difference becomes 1.2 V.

The doping capacity and de-doping capacity correspond to charge capacity and discharge capacity when the electrode is used as the negative electrode of the lithium ion secondary battery. Therefore, the measured dope capacity was defined as the charge capacity, and a measured de-doping capacity was defined as the discharge capacity.

Charging and discharging were repeated 20 times at the same conditions as described above. Then, a capacity retention ratio (%) was defined as "the discharge capacity at the time of de-doping of the 20th cycle" divided by "the discharge capacity at the time of de-doping of the 1st cycle, and multiplied by 100. In the coin battery of Inventive Example 1, the initial discharge capacity, the discharge capacity of the 20th cycle, and the capacity retention ratio were as listed in Table 1.

Inventive Examples 2 and 3, and Comparative Example 1

In Inventive Examples 2 and 3, negative electrode active materials, negative electrodes, and coin batteries were produced in the same way as in Inventive Example 1 excepting that the oxygen concentrations in the pulverization atmosphere were changed to the concentration shown in Table 1. In Comparative Example 1, the negative electrode active material, the negative electrode, and the coin battery were produced in the same way as in Inventive Example 1 excepting that the oxygen concentration in the pulverization atmosphere and the temperature of the pulverization atmosphere were changed as shown in Table 1.

Determination of crystal structure, and evaluation of oxygen concentration in the negative electrode active material and various charge-discharge performances of the coin battery were performed in the same way as in Inventive Example 1.

The result of the determination of crystal structure was the same as in Inventive Example 1. That is, it was confirmed that the alloy phases of Inventive Examples 2 and 3, and Comparative Example 1 had a crystal structure that undergoes M transformation when occluding lithium ions, and undergoes reverse transformation when releasing lithium ions.

The results of the evaluation of the thickness of the surface oxide layer of the negative electrode active material, the oxygen concentration in the surface oxide layer, and various charge-discharge performances of the coin battery were as shown in Table 1.

Inventive Example 4 and Comparative Example 2

In Inventive Example 4, a negative electrode active material, negative electrode, and coin battery were produced in the same way as in Inventive Example 1 excepting that the final chemical composition of the negative electrode active material was changed to the composition according to Table 1. In Comparative Example 2, the negative electrode active material, negative electrode, and coin battery were produced in the same way as in Inventive Example 4 excepting that the oxygen concentration in the pulverization atmosphere and the temperature of the pulverization atmosphere were changed as shown in Table 1.

Determination of crystal structure, and evaluation of oxygen concentration in the negative electrode active material, and various charge-discharge performances of the coin battery were performed in the same way as in Inventive Example 1.

The result of the determination of crystal structure was the same as in Inventive Example 1. That is, it was confirmed that the alloy phases of Inventive Examples 2 and 3, and Comparative Example 1 had a crystal structure that undergoes M transformation when occluding lithium ions, and undergoes reverse transformation when releasing lithium ions.

Results of the evaluation of the thickness of the surface oxide layer of the negative electrode active material, the oxygen concentration in the surface oxide layer, and various charge-discharge performances of the coin battery were as shown in Table 1.

Inventive Example 5 and Comparative Example 3

In Inventive Example 5, the negative electrode active material, negative electrode, and coin battery were produced in the same way as in Inventive Example 1 excepting that the final chemical composition of the negative electrode active material was changed to the composition listed in Table 1. In Comparative Examples 3, the negative electrode active material, negative electrode, and coin battery were produced in the same way as in Inventive Example 5 excepting that the oxygen concentration in the pulverization atmosphere and the temperature of the pulverization atmosphere were changed as shown in Table 1.

Determination of crystal structure, and evaluation of oxygen concentration in the negative electrode active material and various charge-discharge performances of the coin battery were performed in the same way as in Inventive Example 1.

According to the determination of crystal structure, the alloy phase changed as follows as charging/discharging was performed. The alloy phase was M phase (2H structure) before initial charging, M phase (2H structure) after initial charging, and a matrix phase ($DO_3$ structure) after initial discharging, and thereafter, the alloy phase underwent M transformation to be transformed into M phase (2H structure) through charging, and became matrix phase ($DO_3$ structure) through discharging. That is, it was confirmed that the negative electrode of the inventive example had an alloy phase that undergoes M transformation when occluding lithium ions which are metal ions, and undergoes reverse transformation when releasing lithium ions.

Results of evaluating the thickness of the surface oxide layer of the negative electrode active material, the oxygen concentration in the surface oxide layer, and various charge-discharge performances of the coin battery were as shown in Table 1.

Referring to Table 1, in Inventive Examples 1 to 5, in the production process of molten metal, the oxygen concentration in the atmospheric gas wad not more than 5000 ppm. Further, the oxygen concentration in the pulverization process was not more than 20 vol %. For that reason, the thickness of the oxide layer on the surface of the powder material was not more than 10 nm, and the oxygen content in the oxide layer was not more than 70 at %. As a result of that, discharge capacities at the initial and the 20th cycles were not less than 1700 mAh/cm$^3$, and the capacity retention ratio was not less than 90%.

On the other hand, in Comparative Examples 1 to 3, the oxygen concentration in the pulverization process was more than 20 vol %. For that reason, the thickness of the oxide layer of the powder material was more than 10 nm, and the oxygen content in the oxide layer was more than 70 at % as well. As a result of that, the discharge capacities at the initial and the 20th cycles were less than 1700 mAh/cm$^3$, and the capacity retention ratio was less than 90%.

So far, embodiments of the present invention have been described. However, the above described embodiments are merely examples to carry out the present invention. Therefore, the present invention will not be limited to the above described embodiments, and can be carried out by appropriately modifying the above described embodiments within a range not departing from the spirit thereof.

The invention claimed is:

1. A negative electrode active material, comprising:
   a powder material containing an alloy phase which undergoes thermoelastic diffusionless transformation when releasing metal ions or occluding the metal ions; and
   an oxide layer which is formed on the surface of the powder material, and has a thickness of not more than 10 nm,
   wherein the alloy phase contains a crystal structure which is $DO_3$ in Strukturbericht notation,
   wherein the alloy phase undergoes thermoelastic diffusionless transformation when occluding the metal ions and undergoes reverse transformation when releasing the metal ions,
   wherein the alloy phase after the thermoelastic diffusionless transformation contains a crystal structure which is 2H in Ramsdell notation, and
   wherein the alloy phase after the reverse transformation contains a crystal structure which is $DO_3$ in Strukturbericht notation.

2. The negative electrode active material according to claim 1, wherein
   an atomic content of oxygen is not more than 70 at % in the oxide layer.

3. The negative electrode active material according to claim 2, wherein
the alloy phase ins Cu and Sn.

4. The negative electrode active material according to claim 3, wherein
the alloy phase contains 10 to 20 at % or 21 to 27 at % of Sn, with the balance being Cu and impurities.

5. The negative electrode active material according to claim 3, wherein
the alloy phase contains, in place of a part of Cu, one or more selected from the group consisting of Ti, V, Cr, Mn, Fe, Co, Ni, Zn, Al, Si, B, and C.

6. The negative el rode active material according to claim 5, wherein
the alloy phase contains:
Sn: 10 to 35 at %; and
one or more selected from the group consisting of Ti: 9.0 at % or less, V: 49.0 at % or less, Cr: 49.0 at % or less, Mn: 9.0 at % or less, Fe: 49,0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less,
with the balance being Cu and impurities.

7. The negative electrode active material according to claim 1, wherein
the alloy phase contains Cu and Sn.

8. A negative electrode, comprising he negative electrode active material according to claim 1.

9. A battery, comprising the negative electrode according to claim 8.

10. A negative electrode active material, comprising:
powder material containing an alloy phase which contains 10 to 20 at % of Sn, with the balance being Cu and impurities; and
an oxide layer which is formed on the surface of the powder material, and has a thickness of not more than 10 nm, wherein the oxide layer consists of constituting elements of the powder material, and oxygen.

11. A negative electrode active material comprising:
powder material containing an alloy phase which contains: Sn: 10 to 20 at %; and one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.8 at % or less, Si: 49.0 at % or less, B: 5.0 at % or less, and C: 5.0 at % or less, with the balance being Cu and impurities; and
an oxide layer which is formed on the surface of the powder material, and has a thickness of not more than 10 nm wherein the oxide layer consists of constituting elements of the powder material and oxygen.

* * * * *

UNITED STATES PATENT AND TRADEMARK OFFICE
CERTIFICATE OF CORRECTION

PATENT NO. : 10,230,103 B2
APPLICATION NO. : 15/115930
DATED : March 12, 2019
INVENTOR(S) : Yamamoto et al.

It is certified that error appears in the above-identified patent and that said Letters Patent is hereby corrected as shown below:

In the Claims

Column 23, Line 3:
"the alloy phase ins Cu and Sn."
Should read:
"the alloy phase contains Cu and Sn."

Column 23, Line 13:
"6. The negative el rode active material according to claim"
Should read:
"6. The negative electrode active material according to claim"

Column 24, Line 1:
"8. A negative electrode, comprising he negative electrode"
Should read:
"8. A negative electrode, comprising the negative electrode"

Column 24, Line 19:
"% or less, Zn: 29.0 at % or less, Al: 49.8 at % or less,"
Should read:
"% or less, Zn: 29.0 at % or less, Al: 49.0 at % or less,"

Column 24, Line 25:
"10 nm wherein the oxide layer consists of constituting"
Should read:
"10 nm, wherein the oxide layer consists of constituting"

Signed and Sealed this
Third Day of December, 2019

Andrei Iancu
*Director of the United States Patent and Trademark Office*